UNITED STATES PATENT OFFICE.

ALFRED KERN, OF BASLE, SWITZERLAND, ASSIGNOR TO THE BADISCHE ANILIN AND SODA FABRIK, OF MANNHEIM, GERMANY.

MANUFACTURE OF DYE-STUFF OR COLORING-MATTER.

SPECIFICATION forming part of Letters Patent No. 290,893, dated December 15, 1883.

Application filed September 26, 1883. (Specimens.)

*To all whom it may concern:*

Be it known that I, ALFRED KERN, a citizen of the Swiss Republic, residing at Basle, Switzerland, have invented new and useful Improvements in the Manufacture of Dye-Stuffs or Coloring-Matters, of which the following is a specification.

This invention relates to a purple dye-stuff or coloring-matter which I term "ethyl-purple 6B," and which is produced from diethyl-aniline by converting the same into a derivative known in chemical literature by the name of "tetraethyl-diamido-benzophenone," (Beilstein's Handbook of Organic Chemistry, edit. 1883, page 1676,) treating the said derivative with reducing or hydrogenizing agents, combining the hydrogenized product thus obtained with diethyl-aniline, submitting the result of such combination to an oxidizing process, and separating the dye-stuff or coloring-matter thus produced.

In carrying out my invention I take one hundred parts, by weight, of the above-named tetraethyl-diamido-benzophenone and dissolve the same in about one thousand parts, by weight, of amylic alcohol containing about sixty parts, by weight, of dry caustic soda in solution. I then heat the alkaline solution thus obtained with about eighty parts, by weight, of zinc-dust, at a temperature from 120° to 130° centigrade, during about forty-eight hours, or until the reaction no longer appears to proceed. This point may be ascertained by withdrawing a sample of the said alkaline solution from time to time and strongly acidifying the same by the addition of glacial acetic acid, whereby an intensely blue color will be developed. I consider the hydrogenizing action to be finished if the said blue color of the sample no longer increases in intensity. I then allow the mixture to settle, and I draw off the clear solution into a still, in order to distill off the amylic alcohol, which may thus be recovered. The residue which is left behind in the still is then freed from alkali by repeated washings with water, and afterward dissolved in an excess of cold and dilute hydrochloric acid—say in a mixture of about one hundred parts, by weight, of strong hydrochloric acid of 1.18 specific gravity with two hundred and fifty parts of water. The acid solution thus obtained is then filtered, and the filtered liquid is mixed with about fifteen hundred parts of water and fractionally precipitated by the addition of caustic-soda liquor, in order to separate the hydrogenized product from any tetraethyl-diamido-benzophenone which may have remained unacted upon by the hydrogenizing mixture of zinc-dust and alkali, as before described. For this purpose I add caustic-soda liquor until the solution has assumed a pure blue color, whereby a precipitate is formed containing the unaltered tetraethyl-diamido-benzophenone, if any. I then filter and precipitate the filtered solution by adding thereto caustic-soda liquor in slight excess. The hydrogenized product thus precipitated, and which, in chemical language, may be called "tetraethyl-diamido-benzhydrol," is separated from the alkaline liquor by decantation, freed from alkali by washings with water, and dissolved in about one hundred and fifty parts, by weight, of diluted sulphuric acid containing about thirty parts, by weight, of rectified sulphuric acid of 66° Baumé. I then add forty parts, by weight, of diethyl-aniline, and the reaction is allowed to proceed, first at an ordinary temperature during about twelve hours, and afterward at about 100° centigrade during about three hours, or until the combination (or the so-called "condensation") of the hydrogenized product with diethyl-aniline has been accomplished, which point may be ascertained by the entire change of the original blue color of the mixture into a pale greenish hue. This point being arrived at, I add caustic-soda liquor in sufficient excess to liberate the organic bases contained in the said mixture. I then distill off the diethyl-aniline which has remained unacted upon, and I filter and wash the product thus obtained. The said product—which, in chemical language, may be called the "leuco base" of my new coloring-matter—is then submitted to an oxidizing process analogous to that which is now generally used for converting the leuco bases of malachite-green or of similar dye-stuffs into their corresponding coloring-matters. In the present instance I dissolve about twenty parts, by

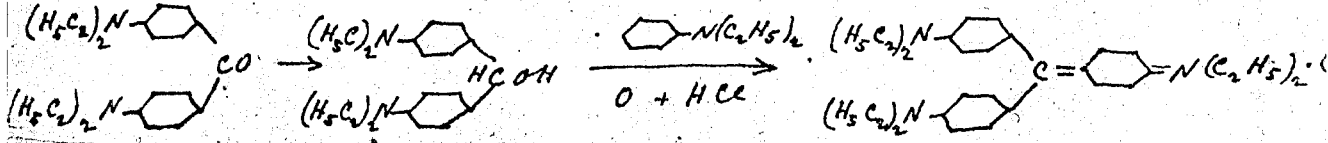

weight, of the said leuco base—my new coloring-matter—in about twenty parts, by weight, of hydrochloric acid of 1.18 specific gravity and about nine hundred parts of water, and to the solution thus obtained I then add, in the cold and under constant agitation, about ten parts, by weight, of peroxide of lead in a state of fine division. The oxidation of the leuco base being accomplished, which is indicated by the purple color of the solution no longer increasing in intensity, I then add about twenty parts, by weight, of crystallized sulphate of soda, in order to free the solution from lead salts, and I precipitate the coloring-matter by the addition of common salt. The precipitate thus produced is separated from the saline solution by decantation, washed, and exhausted with boiling water. The coloring-matter passes into solution, and is again precipitated by the addition of salt-water. By drying the semi-fluid precipitate thus produced in a steam-pan, the coloring-matter is obtained in the state of an amorphous solid mass of metallic green appearance, which may then be ground up or powdered.

My new ethyl-purple 6B, prepared as hereinbefore described has the appearance of amorphous lumps or powder possessing a green bronze-like luster. It dissolves in water with a bright bluish-purple color. Its aqueous solution, upon being mixed with a concentrated aqueous solution of oxalic acid, first turns blue and then green; but there is no separation of crystals as in the same treatment of my new crystallized methyl-violet—an analogous coloring-matter described and claimed in a separate application for Letters Patent bearing date the 18th day of August, 1883.

In dyeing, my ethyl-purple 6B produces purple shades considerably bluer and brighter than those produced by the ethyl-violet of Hoffman or ethylated derivatives of rosaniline hitherto known in commerce.

What I claim as new, and desire to secure by Letters Patent, is—

As a new product, the purple coloring-matter hereinbefore described and having the characteristics above set forth.

In testimony whereof I have hereunto set my hand and seal in the presence of two subscribing witnesses.

ALFRED KERN. [L. S.]

Witnesses:
N. HENZE,
F. FOFACKER.